United States Patent [19]
Schauder

[11] Patent Number: 4,713,745
[45] Date of Patent: Dec. 15, 1987

[54] VECTOR-CONTROLLED UNRESTRICTED FREQUENCY CHANGER (UFC) SYSTEM AND VARIABLE SPEED AC MOTOR DRIVE USING SUCH A SYSTEM

[75] Inventor: Colin D. Schauder, Murrysville Boro, Pa.

[73] Assignee: Westinghouse Electric Corp., Pittsburgh, Pa.

[21] Appl. No.: 888,911

[22] Filed: Jul. 22, 1986

[51] Int. Cl.⁴ .......................................... H02M 5/257
[52] U.S. Cl. ...................... 363/161; 318/809
[58] Field of Search ........................ 363/8–10, 363/160, 161, 162, 164, 165; 318/807, 808, 809, 810, 811, 812

[56] References Cited

U.S. PATENT DOCUMENTS

| | | | |
|---|---|---|---|
| 3,470,447 | 9/1969 | Gyugyi | 363/160 |
| 3,493,838 | 2/1970 | Gyugyi | 363/160 |
| 4,447,786 | 5/1984 | Saar et al. | 318/811 |
| 4,481,457 | 11/1984 | Zach et al. | 318/811 X |
| 4,482,855 | 11/1984 | Otsuka et al. | 318/809 |
| 4,538,220 | 8/1985 | Gyugyi | 363/161 |
| 4,578,746 | 3/1986 | Gyugyi et al. | 363/161 |
| 4,581,696 | 4/1986 | Gyugyi et al. | 363/161 |
| 4,648,022 | 3/1987 | Schauder | 363/161 X |

OTHER PUBLICATIONS

F. Bilalovic et al., "Current Inverter in the Sliding Mode for Induction Motor Control" IFAC Symposium on Control in Power Electronics and Electrical Drives, Lausanne, Switzerland 1983, Pergamon Press, 1984, pp. 139–144.
R. Gabriel et al., "Field-Oriented Control of a Standard AC Motor Using Microprocessors", IEEE Transactions or Industry Application, vol. 1A-16, No. 2, Mar.-/Apr. 1980, pp. 186-220.
W. Leonhard, "Control of AC-Machines with the Help of Microelectronics", Inst. F. Regelungstechik, Techn. University Braunscheweig, Germany, pp. 35-58.

Primary Examiner—Peter S. Wong
Attorney, Agent, or Firm—C. M. Lorin

[57] ABSTRACT

A UFC is controlled with polar coordinates, a phase checked loop combining with an angular demand to establish a predetermined and tuned sequence of switch combinations between the converters of the UFC, to generate between the output phase-loads the desired voltage vector.

9 Claims, 21 Drawing Figures

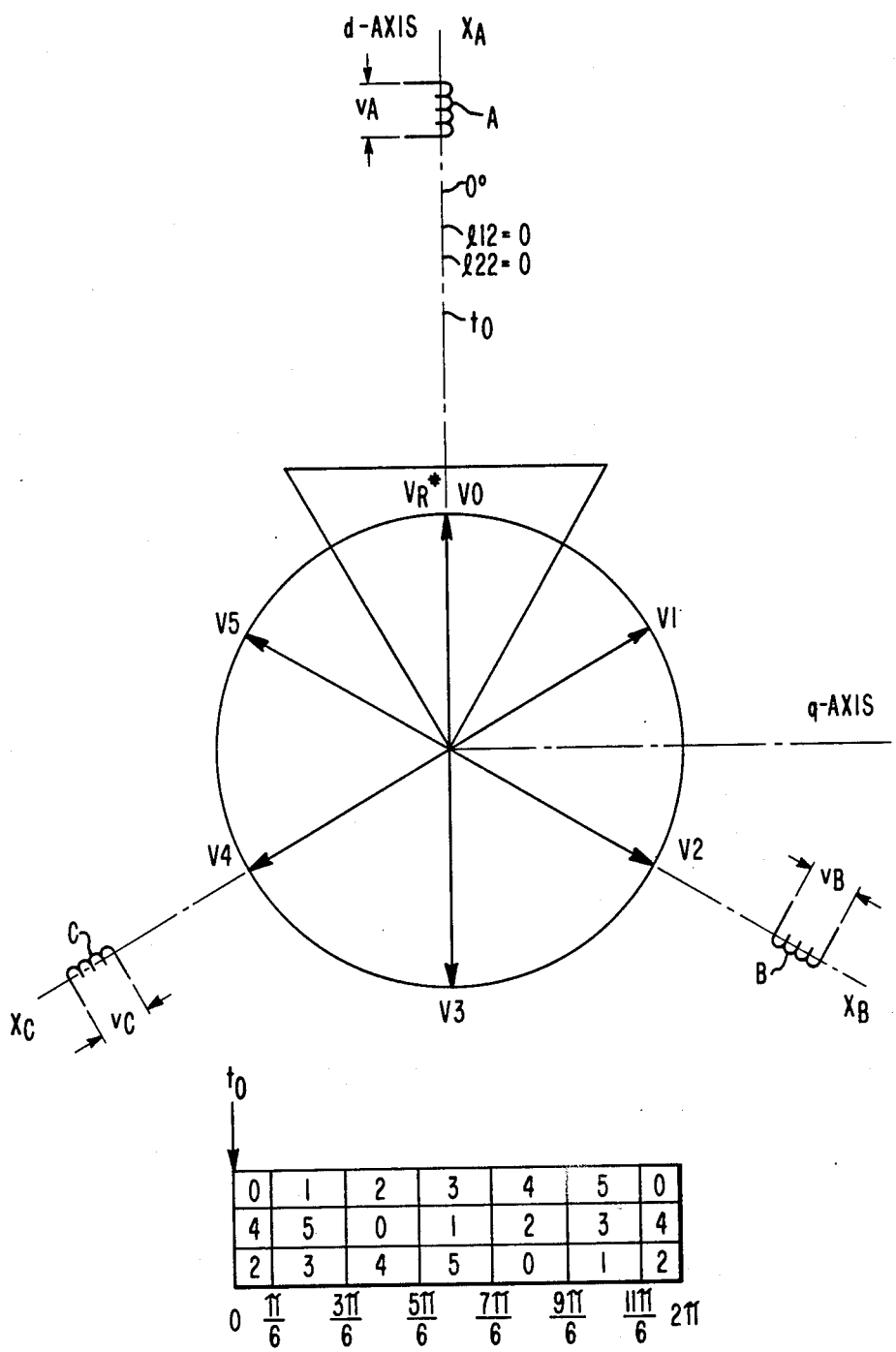
FIG. IIC

VECTOR-CONTROLLED UNRESTRICTED FREQUENCY CHANGER (UFC) SYSTEM AND VARIABLE SPEED AC MOTOR DRIVE USING SUCH A SYSTEM

CROSS-REFERENCE TO RELATED APPLICATION

The present patent application is related to copending patent application Ser. No. 888,407 concurrently filed and entitled "Voltage-Controlled Field-Oriented Induction Motor Control System." This copending application is hereby incorporated by reference.

BACKGROUND OF THE INVENTION

The prior art is repleted today with vector or field-oriented control of an induction-motor using information derived from the terminal currents to the motor. See for instance IFAC Symposium on Control in Power Electronics and Electrical Drives, Lausanne, Switzerland 1983, Pergamon Press, Oxford 1984;

"Current Inverter in the Sliding Mode for Induction Motor Control," by F. Bilalovic, A. Salanovic, pp. 139–144;

"Field-Oriented Control by Forced Rotor Currents in a Voltage-Fed Inverter Drive," by J. Holtz and S. Stadtfeld, pp. 103–110; and "Control of AC-Machines with the Help of Microelectronics," by W. Leonhard, pp. 35–58.

For the purpose of this disclosure, these articles published by Pergamon Press, Oxford 1984, are hereby incorporated by reference.

There are two basic approaches to controlling an AC motor drive. One consists in using voltage and frequency as parameters to adjust the speed of the motor. The drawback here is that for a stepped change in voltage and frequency, the dynamic response of the system is poor. Another approach is the field-oriented control method, which in the past has been implemented in terms of current control, in a close-loop or an open-loop fashion.

The present invention relates to method and apparatus in a field-oriented vector control system for controlling a UFC by providing an AC voltage controlled directly in response to a vector voltage demand applied in terms of magnitude and instantaneous angular position. In the afore-stated incorporated by reference patent application, torque and flux demand were used to generate a voltage demand defined in terms of rectangular coordinates to control an AC motor. With the present invention, the latter approach is extended to UFC systems by converting the voltage demand into vector polar coordinates and using such polar coordinates to control the UFC.

It is known from U.S. Pat. No. 4,482,855 to control a cycloconverter in relation to a current demand and a frequency demand to generate voltage direct and quadrature component demand leading to phase voltage demand for control of the cycloconverter. A cycloconverter, however, is different from a UFC. The former is essentially a restricted frequency changer, in particular since it is naturally commutated. In contrast, the present invention proposes to apply voltage demand control to a UFC. The UFC up to now, was aimed only at controlling frequency. Thus, in the prior art, frequency and time were the two parameters involved in the control of the UFC. The switching sequence was controlled in relation to a frequency demand, and within each switching stage, the time of conduction was established in accordance with a desired output voltage in magnitude.

SUMMARY OF THE INVENTION

The invention resides in controlling a UFC in accordance with a voltage demand defined in terms of polar coordinates, thereby to satisfy the control objectives of a given control system embodying such UFC, which may be, for instance, an AC motor drive operated under a particular control scheme. In the case of a motor drive, the invention provides for a UFC-type direct AC-to-AC converter controlled in response to a voltage demand assigned in magnitude and angular position, so that the UFC provides appropriate stator phase voltages matching such polar voltage vector demand and applied directly to the motor.

BRIEF DESCRIPTION OF THE DRAWINGS

FIG. 11C is similar to FIG. 11A except that the control logic circuit of FIG. 9 has been amended to define a different initial position for the vectors when the signals have zero value at the input;

FIG. 12C is like FIGS. 12A and 12B where the output vector angular demand is suddenly changed in amplitude and in sign, the demand being decreased steadily from there on.

DETAILED DESCRIPTION OF THE PRESENT INVENTION

Figure 1:
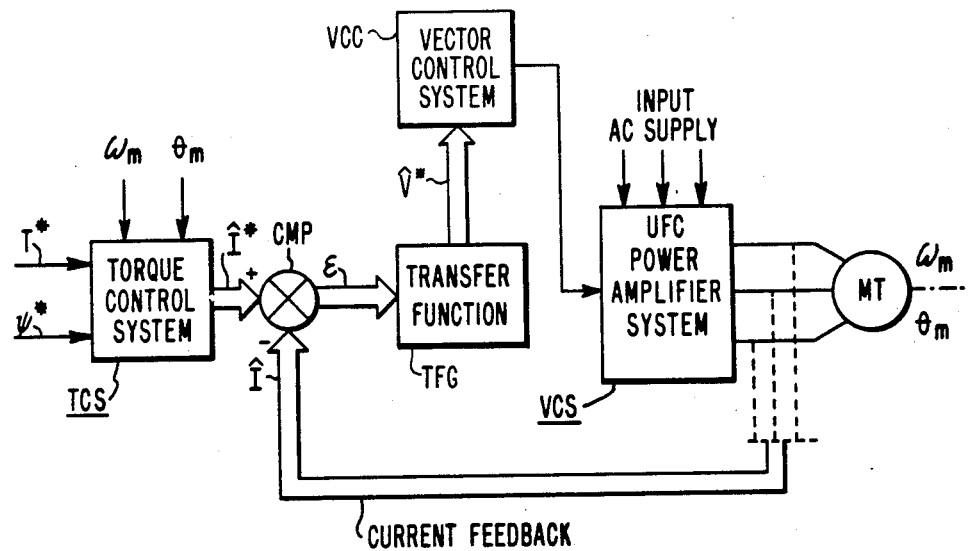
FIG. 1 shows a torque-controlled AC motor drive of the UFC type involving current vector demand control with a current control close loop and improved by the voltage control system according to the present invention.

Referring to FIG. 1, an AC motor drive according to one embodiment of the invention is shown to include a torque control system TCS responding to a torque demand $T^*$, to a flux demand $\psi^*$, to the angular position $\theta_m$ of the motor shaft of the motor MT and to the angular speed $\omega_m$ thereof. The torque control system TCS provides as generally known under field-oriented control technique, a current vector demand $\hat{I}^*$ which is compared with a vector current feedback $\hat{I}$ derived from sensing the stator currents. The resulting error $\epsilon_{is}$ converted by a transfer function generator TFG, or compensating circuit, into a vector voltage demand $\hat{V}^*$. It is the object of the present invention to control a power amplifier system of the UFC type (UFC) in response to such vector voltage demand so as to generate, on the output terminals, phase voltages as required to satisfy the voltage demand. In a motor drive, the UFC power amplifier system is controlled so as to provide directly the terminal voltages for the motor. To this effect, a vector control system VCC according to the invention is provided responding to the vector voltage demand $\hat{V}^*$.

Figure 2:
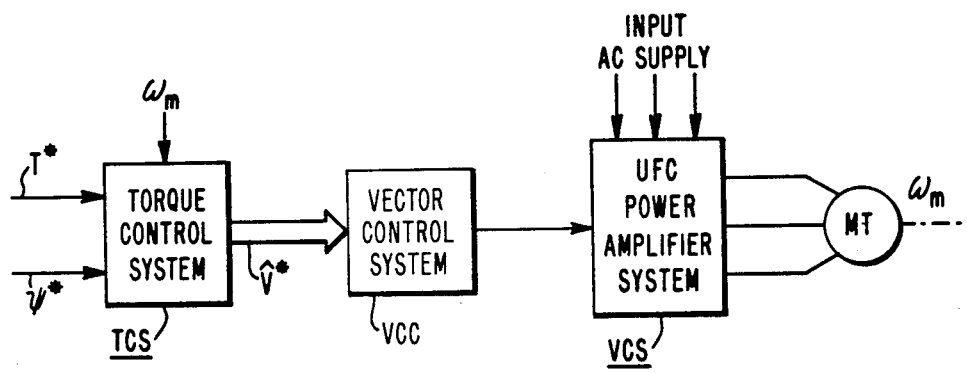
FIG. 2 illustrates the use of the voltage control system according to the present invention with an open loop current control system involving field-oriented control and a torque demand like in the incorporated by reference patent application but applied to a UFC type motor drive.

Referring to FIG. 2, a block diagram is shown of another embodiment of the invention, in which when controlling a UFC, instead of sensing currents on the stator, in an open loop a torque demand $T^*$ and a flux demand $\psi^*$ are applied to a torque control circuit TCC as shown in the copending patent application to generate a vector voltage demand $\hat{V}^*$. According to the present invention, a vector control system VCC is used to control a UFC system, rather than an inverter as in the copending patent application. Vectorial coordinates of the voltage demand are derived in response to the said torque demand $T^*$, flux demand $\psi^*$ and the rotation speed of the motor shaft. Like in the system shown in FIG. 1, a voltage control circuit VCC provides, according to the present invention, phase voltages at the output which are directly generated by the UFC in accordance with the voltage vector demand.

The Unrestricted Frequency Changer (UFC) of the prior art uses bilateral static switches used for the generation of an AC wave of controlled voltage and frequency. This type of UFC is described in U.S. Pat. Nos. 3,470,447 and 3,493,838 of L. Gyugyi et al. These patents are hereby incorporated by reference. These patents show how the switches in each of the static converters associated with an output phase of the load can be selectively and cyclically controlled for conduction during a predetermined time interval so as to derive an output power defined by a controlled increment of the input voltage, itself delineated between two adjacent time intervals each used for shorting the output, which process results in an AC output voltage having a frequency depending upon the repetition rate of the conduction time intervals and a magnitude measured by the time period of effective conduction of each static switch. Such an unrestricted frequency changer is advantageously applied in variable speed AC drives as explained on pages 5–14, and 363–383 of "Static Power Frequency Changers" by L. Gyugyi and B. R. Pelly, published by John Wiley & Sons 1976. In this regard, for instance, Gyugyi and Pelly have observed that the UFC has an inherent bilateral characteristic between the power source at its input and the power supply at its output, which allows a four-quadrant operation of the motor drive without costly additional circuitry.

The unrestricted frequency changer technique has become particularly attractive with the advent of modern bilateral switches, for instance, power transistors, and GTO devices.

The present invention will be described in the context of a six-pulse frequency changer converting a standard three-phase AC power system into a three-phase variable voltage variable phase output as can be used for supplying power to an induction-motor.

A six-pulse frequency changer, as shown in the aforementioned Gyugyi patents, includes three sets of six bilateral switches controlled concurrently for establishing controlled time intervals of conduction for selected pairs of the switches thereby to sample successive and discrete segments of the input voltages at a selected repetition rate, so as to obtain at the output a reconstructed voltage of desired magnitude and frequency. The controlled output variables are the frequency and the voltage amplitude. The three input terminals are successively selected by pairs in six possible connections through two conductive bilateral switches onto corresponding pairs of the output terminals. Sampling of the input voltage so derived is effected successively for the six voltage connections in each set of switches and concurrently therebetween. If the standard supply frequency is $f_s$ Hz, and the sampling recurrence is T sec., the output frequency by definition is: $f_o = f_s - (1/6\,T)$. A high quality output voltage is obtained when T is less than, or equal to, $(1/6\,f_s)$. The output frequency is varied by varying T, the sampling recurrence, and the output voltage is controlled in magnitude by short-circuiting the output voltage during such time interval T so as to establish a controlled duty cycle.

While the UFC output voltage has been controlled in the prior art in terms of magnitude and frequency, the present invention proposes a type of UFC system in which the output voltage is controlled in terms of an output voltage space vector, i.e., by amplitude and phase angle, such a space vector controlled UFC system being applied to an AC motor drive. This approach differs fundamentally from the control scheme used in the Gyugyi patents. There, the phase of the output voltage is not controlled as an absolute quantity. Actually, the instantaneous output phase angle is, in the Gyugyi patents, indirectly determined by the phase angle of the input AC power supply voltages *and* by the switching sequence of the UFC system.

Figure 3:
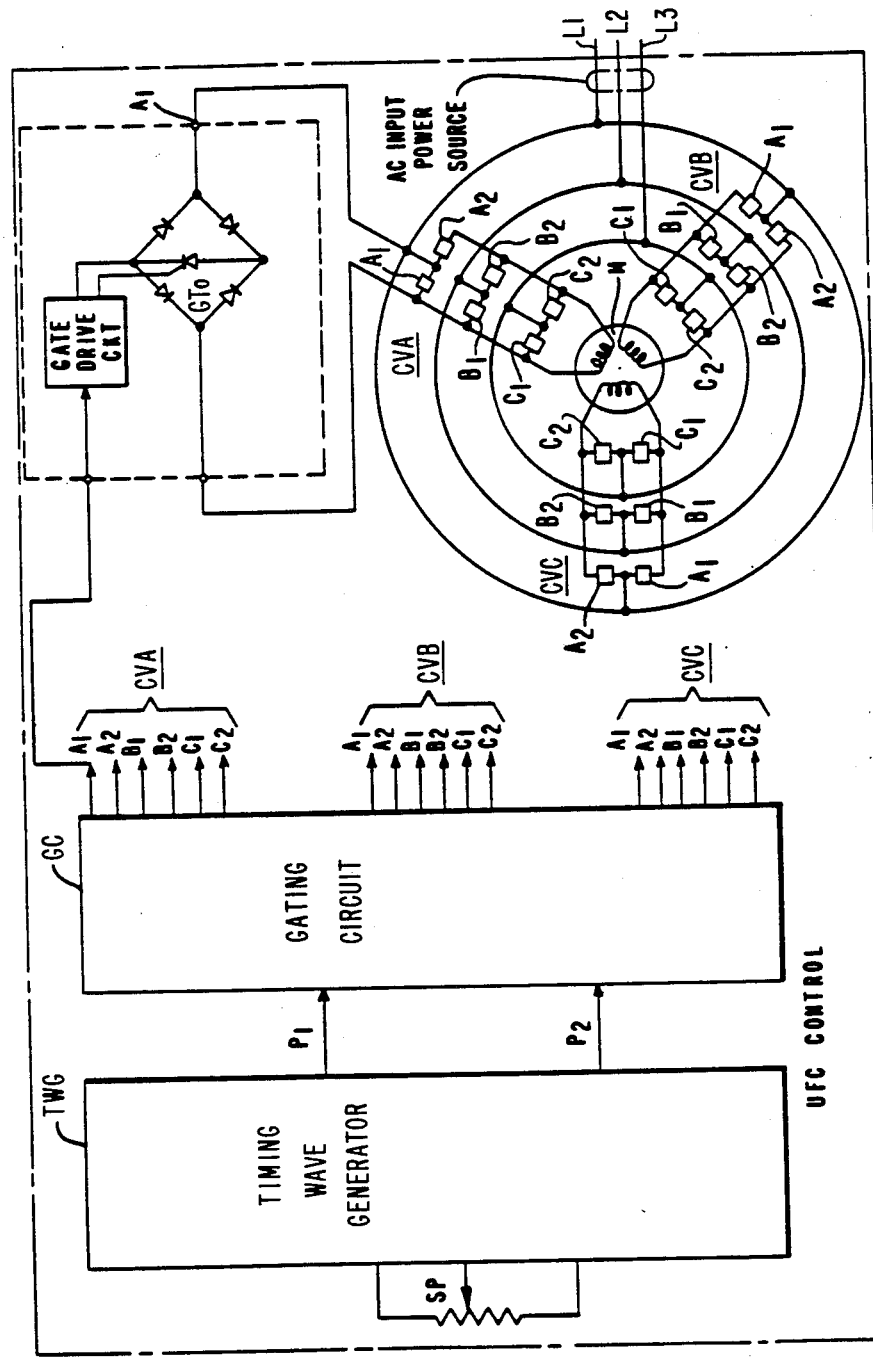
FIG. 3 shows a UFC system of the prior art for illustration.
Figure 4:
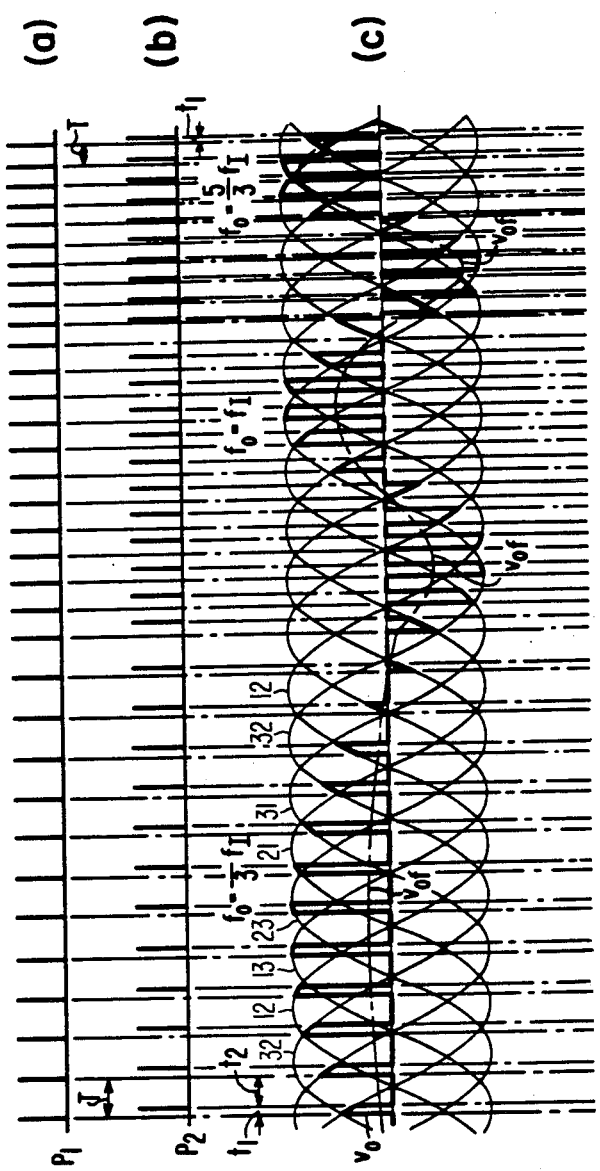
FIG. 4 illustrates with curves the sampling technique used for the reconstruction of the output waveform in a UFC according to the prior art of FIG. 3.

FIGS. 3 and 4 are borrowed from the aforementioned incorporated patents of Gyugyi. FIG. 3 shows the arrangement of three sets of six bilateral switches (A1, A2), (B1, B2) and (C1, C2) each associated with one winding (WA, WB, WC) of an induction motor, each pair of bilateral switches, such as (A1, A2), being connected in series between the two ends of the associated winding, and having a common point connected to one input phase: line 1 for (A1, A2); line 2 for (B1, B2), and line 3 for (C1, C2). Each bilateral switch, as shown in FIG. 3 for A1, includes a GTO device mounted across a diode bridge to establish conduction, or terminate conduction, at will. As explained in the Gyugyi patent, these three sets, identified as converters CVA, CVB, CVC for the respective windings and phases A, B, C of the AC motor, are controlled by a gating circuit GC via pulses P1 and P2 which, as shown in FIG. 4 under (a) and (b), are selectively spaced to establish a controlled pulse-width for conduction ($t_1$–$t_2$) on the sampled voltage ($v_{12}$, $v_{13}$, ...) of input AC power supply (L1, L2, L3). The pulses $P_1$ and $P_2$ have also a rate of repetition which determines the frequency $f_o$ of the outputted AC wave, the magnitude Vo of which depends upon the width of the interval between $P_1$ and $P_2$, i.e., the time of conduction. The sampled voltages $v_{12}$, $v_{13}$, $v_{23}$, are separated by natural commutation operative points NC.

In each converter (CVA, CVB, CVC) the switches A1 through C2 are controlled individually as shown by A1-C2 and selectively by the logic of the associated gating circuit GC.

For instance, when in converter CVA, A1 and C2 are controlled for conduction, winding A sustains a voltage $v_{13}$, namely between phase 1 and phase 3. If A2 and C1 are conducting, the opposite is applied to winding A, namely $v_{31}$. When pulses $P_1$ and $P_2$ (FIG. 4) no longer delineate the interval of conduction, the winding is short-circuited, which can be established by controlling adjacent switches such as (A1, A2); (B1, B2) or (C1, C2), and this is preferably done by using a switch adjacent in the converter to one already conducting, thus (A2, A1) after (A2, C1), or (C1, C2) thereafter. This is according to the logic of gating circuit GC.

The invention is applicable to any (UFC) system, namely 3-pulse, six-pulse, 12-pulse or even 24-pulse. The preferred embodiment will be described hereinafter in the context of a six-pulse (UFC) system. The characteristics of operation of a (UFC) system have been thoroughly described in the afore-mentioned book of Gyugyi and Pelly.

It appears from FIG. 4 of the prior art, that upon each command of conduction of a selected pair of bilateral switches, the voltage existing between corresponding two of the input terminals 1, 2, 3, also selected as a result of the particular combination of two conducting switches, is sampled by a pair of pulses $P_1$ and $P_2$ which are sampling the successive waveforms, namely $V_{12}$, $V_{13}$, $V_{23}$, $V_{21}$, $V_{31}$, and $V_{32}$ in the order of the six combinations of the three terminals 1, 2, 3. By reconstruction of the series of samples so derived, upon each phase A, B or C is generated an output wave form such as $V_o$ in FIG. 4. The output has a frequency $f_o$ depending upon the repetition rate of pulses ($P_1$, $P_2$) and an amplitude depending upon the width ($t_1$–$t_2$) between two pulses $P_1$, $P_2$.

Figure 5A:
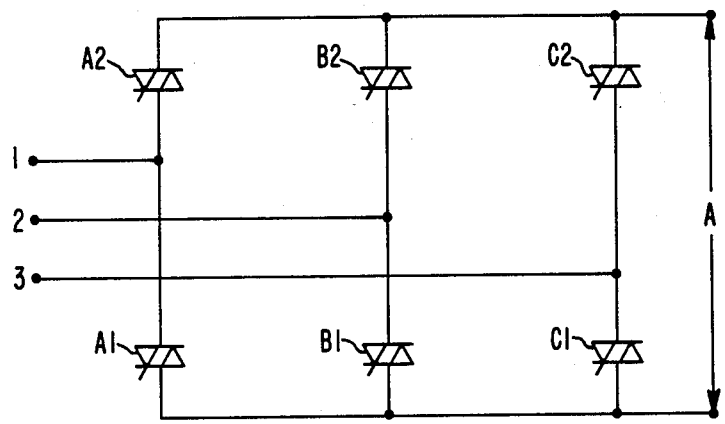
FIG. 5A shows one of the converters of the UFC of FIG. 1.
Figure 5B:
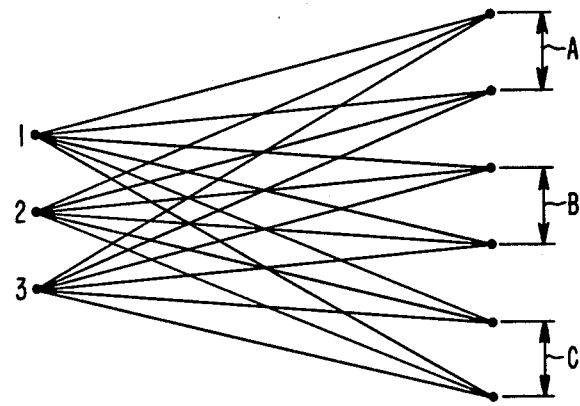
FIG. 5B shows the interconnection between interphase inputs and the phase outputs in a UFC under switch combination sequential control.

Referring now to FIGS. 5A, 5B, the overall operation is illustrated for converter CVA on FIG. 5A, while in FIG. 5, connecting lines are illustrating the possible paired relationships between the terminal inputs 1, 2, 3 and the three output phases A, B, C. The combination of terminals 1 and 2, for instance by switches A1 and B2, applies a voltage $v_{12}$ during conduction to output winding A. There will be another combination of terminals 1 and 3 applying $v_{13}$ to the same winding, etc ... as shown by the interconnecting lines of FIG. 5B. Inbetween conduction time intervals, two switches are short circuiting the winding. As a result, a voltage $v_A$ is built-up between the two ends of winding A. FIG. 5B shows the same type of interconnections between the input terminals 1, 2, 3 and each of the two other windings B, C. Thus, voltages $v_B$ and $v_C$ are built up across those windings, respectively. It is observed that the selection of input terminals 1, 2, 3 by pairs is applied concurrently to each of the three sets of bilateral switches, i.e. of converters CVA, CVB, CVC.

It appears that in the Unrestricted Frequency Changer of the prior art just described, the controlled output variables are frequency and amplitude one being determined by the recurrence of pulses $P_1$, $P_2$, the other by the spacing between $P_1$ and $P_2$. Each of the three outputs of the six-pulse UFC is formed by sequentially sampling the six possible main connections $v_{12}$, $v_{13}$, $v_{23}$, $v_{21}$, $v_{31}$ and $v_{32}$. If the input supply frequency is $f_i$ and the sampling recurrence is T, the output frequency $f_o$ is $f_o = f_i - (1/6\ T)$ where f is in Hertz and T in seconds. If T is less than, or equal to, (1/6 $f_i$) a high quality output voltage wave is obtained. The output frequency is controlled by varying T whereas the magnitude of the output voltage is controlled by short-circuiting the load periodically within the duty cycle T.

In the light of the prior art UFC just described, the present invention will now be explained and distinguished. The gist of the present invention resides in considering the output voltage $V_o$ of the UFC as a space vector having magnitude and phase angle rather than as a conventional sine wave output.

Figure 6:
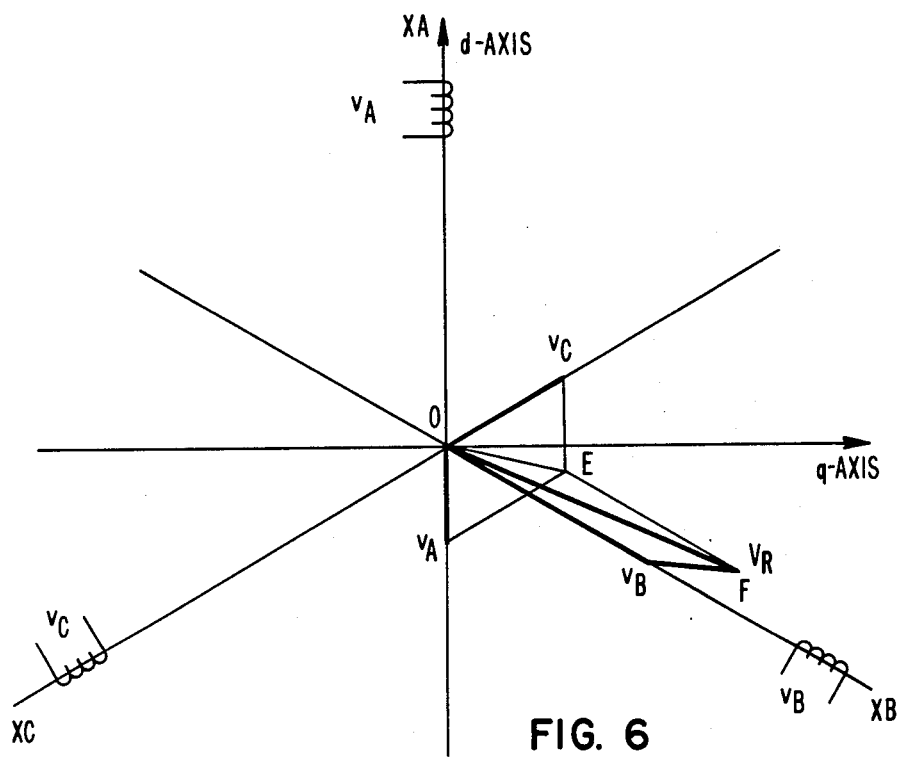
FIG. 6 is a vectorial representation of the phase voltages in a three-phase machine, and the corresponding resultant polar coordinates vector.
Figure 7A:
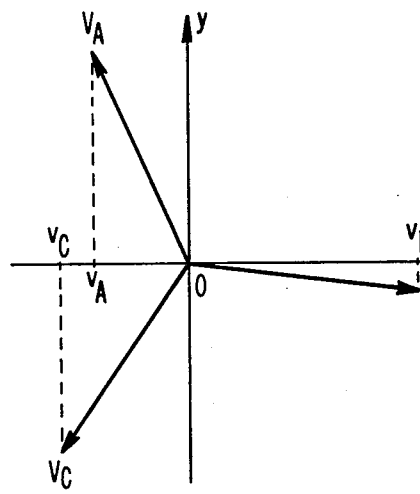
FIG. 7A illustrates phase voltage vectors corresponding to the components shown in FIG. 6 as they rotate with time, and the resulting phase voltages are shown in projection on a common axis.

As a basis for understanding of such space vector consideration, referring to FIG. 6, the three voltages $v_A$, $v_B$, $v_C$ built-up by the UFC, i.e., by converters CVA, CVB and CVC in operation, are formed along three axis at 120° to one another, XA, XB and XC. Voltages $v_A$, $v_B$ and $v_C$ are piecewise sinusoidal in nature. Rotating phase voltage time vectors (VA, VB and VC, of same magnitude equal to the maximum value of each sine wave, and at 120° to one another) are shown in FIG. 7A by reference to coordinates (x, y). By projection of the phase voltage time vectors on the time axis (x), it appears that $v_A$, $v_B$ and $v_C$ are defined instaneously during rotation. Such projected values are what appears across the phases A, B, C respectively, and they are, there, oriented along the XA, XB, XC axis on the positive, or negative side thereof, as shown in FIG. 6. Composition of these vectors, as OE between $v_A$ and $v_C$ and $V_R$ between OE and $v_B$, leads to a single resultant space vector $V_R$. Assuming a direct axis along XA, and a quadrature axis perpendicular to $X_A$, vector $V_R$ is defined by its magnitude and by an angle $\theta$ counted from the d-axis, as shown in FIG. 5B.

Since $v_B$ and $v_C$ are inclined by 60° over the d-axis, and by 30° over the d-axis, it follows by projection on the d-axis that:

$$v_q = v_B \cos 30° - v_C \cos 30° = \frac{\sqrt{3}}{2} v_B - \frac{\sqrt{3}}{2} v_C$$

and by projection on the d-axis:

$$v_d = v_A - \cos 60°\ v_B - \cos 60°\ v_C$$

-continued
$$= v_A - \frac{1}{2} v_B - \frac{1}{2} v_C.$$

Accordingly, $V_R = \sqrt{v_d^2 + v_q^2}$ in magnitude and the vector angle is $\theta = \text{arc tang}(v_q/v_d)$.

According to the present invention, $\theta$ is chosen as one control parameter which may vary in one direction for forward rotation, in the opposite direction for reverse, and the magnitude of $V_R$ is another control parameter in the control scheme according to the present invention. The implementation will appear from further considerations explained hereinafter.

For the purpose of emphasizing the contrasting approaches, the present invention will be compared to the six-pulse UFC of Gyugyi shown in FIGS. 3 and 4. If $v_{12}, v_{13}, v_{23}, v_{21}, v_{31}$ and $v_{32}$ are the successively connected voltages from the input lines 1, 2, 3 to the output phases A, B, C, during the conduction time intervals, and if zero is indicative of short-circuiting the output phase inbetween, the following table illustrates the operative sequence of converter CVA:

|  | CVA |
|---|---|
| $v_{12}$ | A1 + B2 |
| 0 | A1 + A2 |
| $v_{13}$ | A1 + C2 |
| 0 | C1 + C2 |
| $v_{23}$ | B1 + C2 |
| 0 | B1 + B2 |
| $v_{21}$ | B1 + A2 |
| 0 | A1 + A2 |
| $v_{31}$ | C1 + A2 |
| 0 | C1 + C2 |
| $v_{32}$ | C1 + B2 |
| 0 | B1 + B2 |

Figure 8:
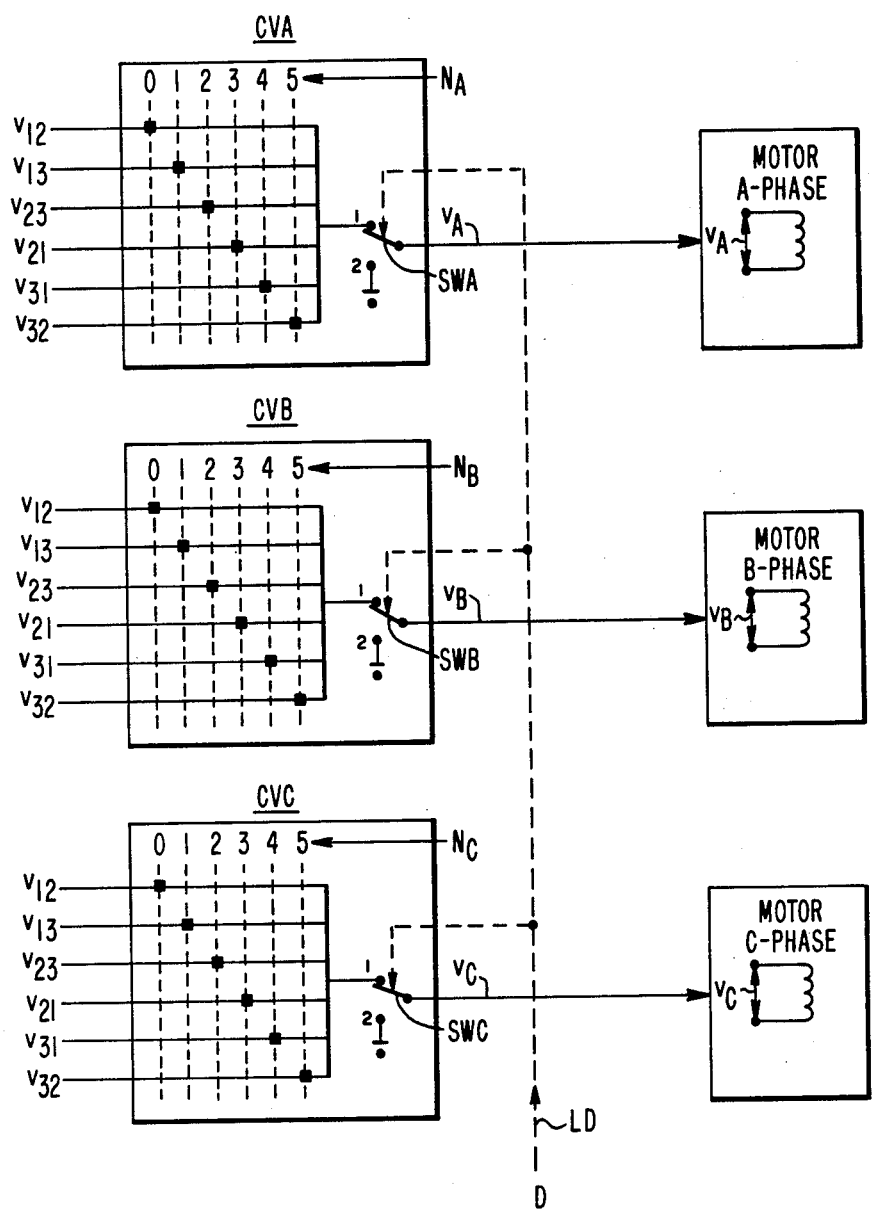
FIG. 8 illustrates the control structure provided by the bilateral switches of the three converters of a UFC like in FIG. 3 in the case of a six-pulse three-phase UFC.

The same can be said of converters CVB and CVC, the pairing in relation to the input combination of terminals being at 120° phase shift relative to the above CVA table step succession for the successive output phases. The paired bilateral switches are identified by N=0 to 5 for the six successive combinations, thus establishing each time a pair of connections such as illustrated in FIG. 5B. With this notation, the operation of a six-pulse UFC can be schematized generally as shown in FIG. 8. $N_A$ denotes for converter CVA a control signal establishing successively a connection from $v_{12}, v_{13} \ldots$ to build up a voltage $v_A$ across phase A of the motor. $N_B$ has the same connotation for phase B, and $N_C$ for phase C. For the sake of illustration, on FIG. 8 three switches SWA, SWB and SWC have been added to the main switches of FIG. 3. It is understood, however, that as in the Gyugyi patent, the function of temporarily short-circuiting the output phases is accomplished by a combination of the main switches thus without any additional switch like SWA, SWB, SWC. When a switch SWA, interposed on the output line from the conducting bilateral switches of CVA to the output phase A (position #1), goes to position 2, a short-circuit is established across phase A. The same can be said of switches SWB and SWC for CVB and CVC and phases B and C, respectively. A signal $\overline{D}$ on line $L_D$ causes the switches SWA, SWB and SWC to switch concurrently into position #2, thereby short circuiting all three output phases at the same time.

Figure 7B:
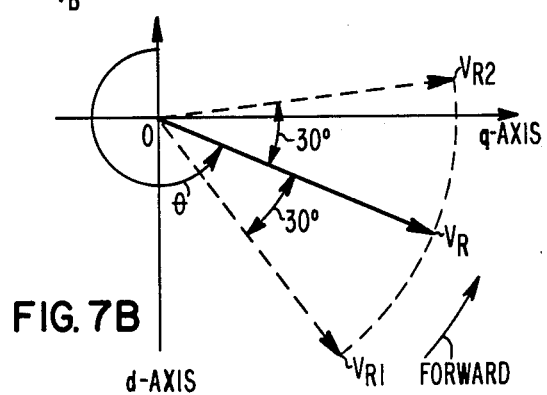
FIG. 7B shows oscillations under commutation of the resultant voltage vector of FIG. 6.

For the sake of simplicity, it will be assumed first that switches SWA, SWB and SWC of FIG. 8 are in position #1, thus are not used to short circuit the output loads, so that the output voltage vector $V_R$ of FIG. 7B is not reduced in magnitude, while being controlled angularly. With this understanding, a vector $V_R$ is generated in angular position when one combination of switches has been chosen between the three converters CVA, CVB and CVC. This voltage is the result of the instantaneous selection of three line-to-line voltages such as $v_{12}, v_{23}$ and $v_3$ at the input of the UFC for the respective converters, which voltages are applied to the spatially distributed output wads, or windings of the induction motor A, B and C. As shown by FIG. 6, the corresponding voltages $V_A, V_B, V_C$ combine spatially to form the resultant vector $V_R$. From the instant of commutation, namely when, as shown in FIG. 5B, pairs of switches in each converter have been chosen to connect a specific combination of inputs (1, 2, 3) with the output terminals (A, B, C), vector $V_R$ is rotating at the angular speed defined by the input voltages through 60 degrees, (FIG. 7B) from an initial position $V_{R1}$ to a final position $V_{R2}$, at which time another and subsequent combination of switches is chosen. Accordingly, the new combination of voltages at the inputs (1, 2, 3) causes vector $V_R$ to occupy again a position like $V_{R1}$, from which vector $V_R$ will again rotate through 60° to position $V_{R2}$. As seen from one switch combination to the next, vector $V_R$ will appear to oscillate between $V_{R1}$ and $V_{R2}$ with an average position aligned with the median line of the triangle defined by the 60° vertex. If $\omega_s$ is $2\pi x f_s$, the angular speed of the input wave, vector $V_R$ rotates forward with an angular displacement $\omega_s t$.

When in position #1, SWA, SWB, SWC establish connections in the A-phase, the B-phase and the C-phase under control signals NA, NB, and NC for CVA, CVB and CVC according to the following rule:

For ACB sequence $N_B = (N_A + 2)$ MODULO 6

$N_C = (N_A + 4)$ MODULO 6

For ABC sequence
$N_B = (N_A + 4)$ MODULO 6

$N_C = (N_A + 2)$ MODULO 6

Incrementing $N_A$ moves the resultant space vector $\pi/3$ radians positively for such ABC sequence, and $\pi/3$ negatively for ACB sequence. If $N_A$ stays constant, then, the space vector phase angle increases at $(2\pi f_s)$ rad/s positively for ACB, and negatively for ABC. The amplitude of the space vector remains constant. In order to hold the vector angle to a constant average value, $N_A$ must be incremented each time the mains completes a $\pi/3$ phase swing. If the mains phase $\phi_s$ is measured (modulo $2\pi$) and $N_A$ is set to be:

$$(\phi_s/(\pi/3)) - \frac{(\phi_s)_{MODULO\ \pi/3}}{\pi/3}$$

then, $N_A$ is incremented each time $\phi_s$ passes a $\pi/3$ point and the voltage vector will oscillate about a constant mean angle. Each cycle of this oscillation comprises a $\pi/3$ swing in phase followed by a sudden reset to the initial angle.

If an angle $\phi_d$ is added to the main phase $\phi_s$, a new angle $\phi$ appears, instead of $\phi_s$, to generate $N_A$. The resulting vector $V_R$ will oscillate about another axis which is shifted by $\phi_d$ rads from the first axis. If $\phi_d$ increases (modulo $2\pi$) at constant rate $\omega$, then, the voltage vector $V_R$ will rotate at the average rate of change of angle w with "ripple" in the instantaneous phase angle. Each cycle of this ripple comprises a swing in phase at the mains frequency, followed by a sudden step of $\pi/3$ in the opposite direction. The ripple frequency is: $6 \cdot (f_i + (\omega/2\pi))$ Hz.

Figure 9:
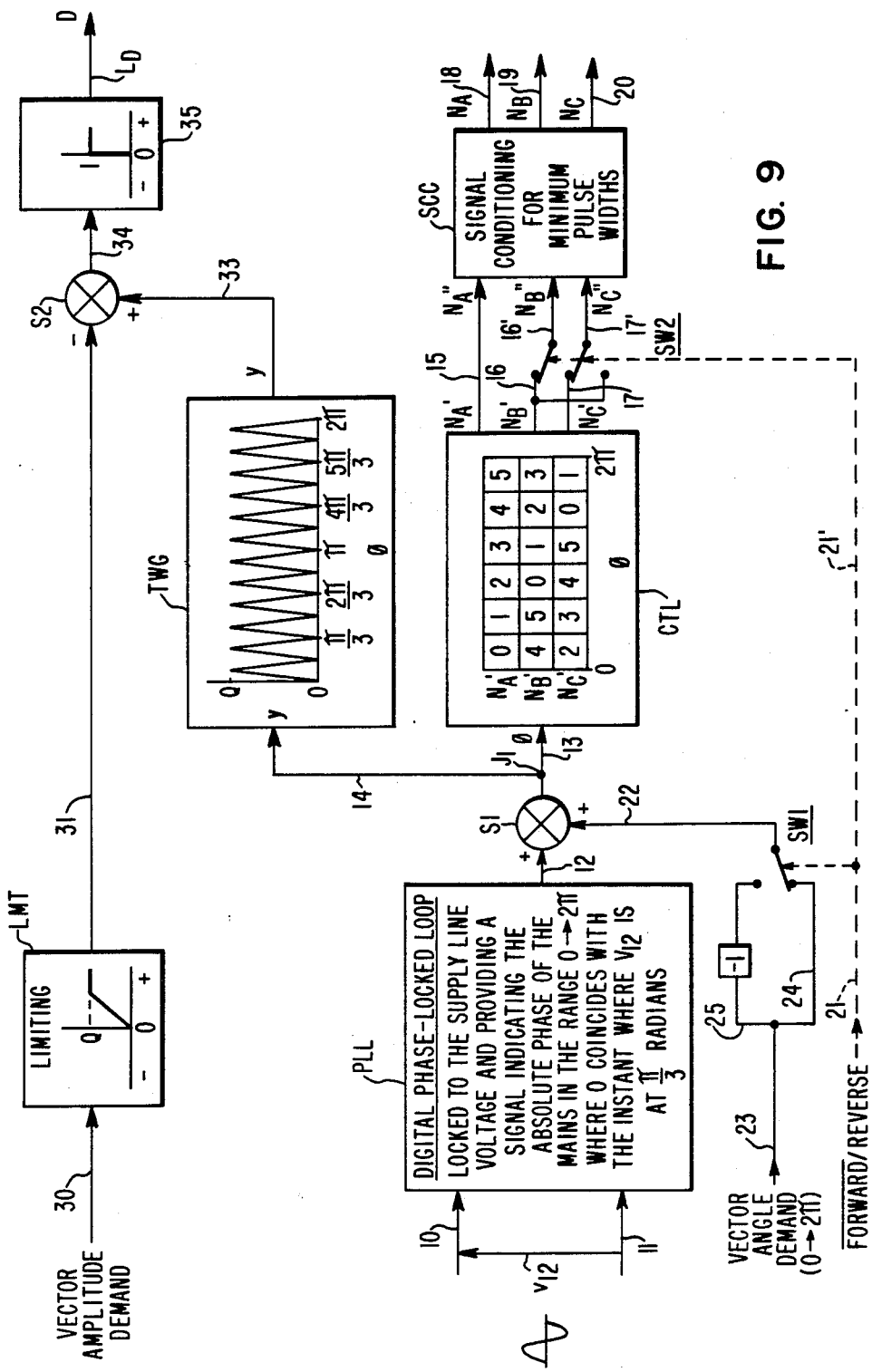
FIG. 9 is a block diagram representation of the control scheme as can be applied to the UFC system of FIG. 8, in order to generate directly stator phase voltages on the motor matching the polar coordinates voltage vector demand.
Figure 10:
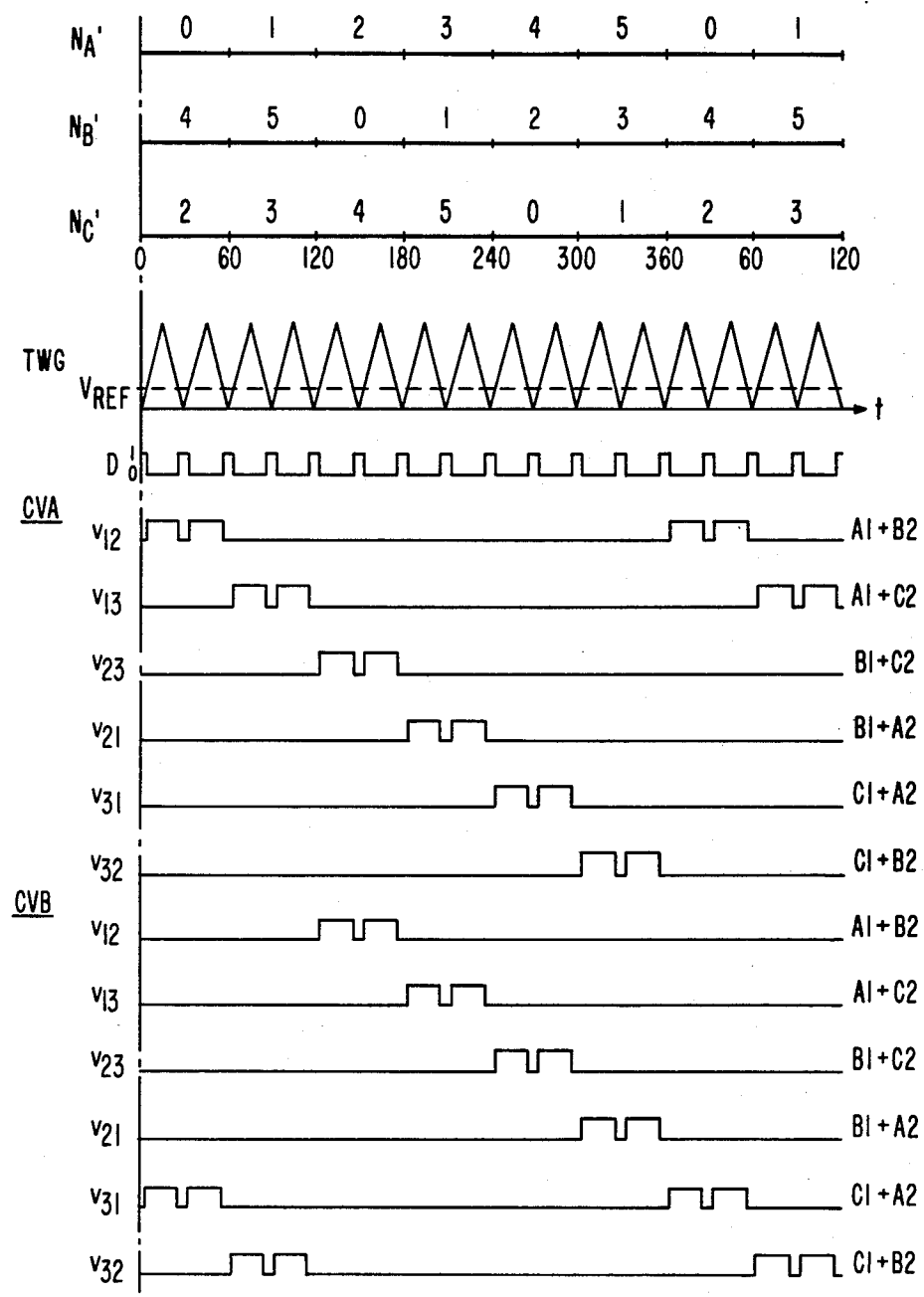
FIG. 10 illustrates with curves the operation of the control system of FIG. 9.
Figure 11A:
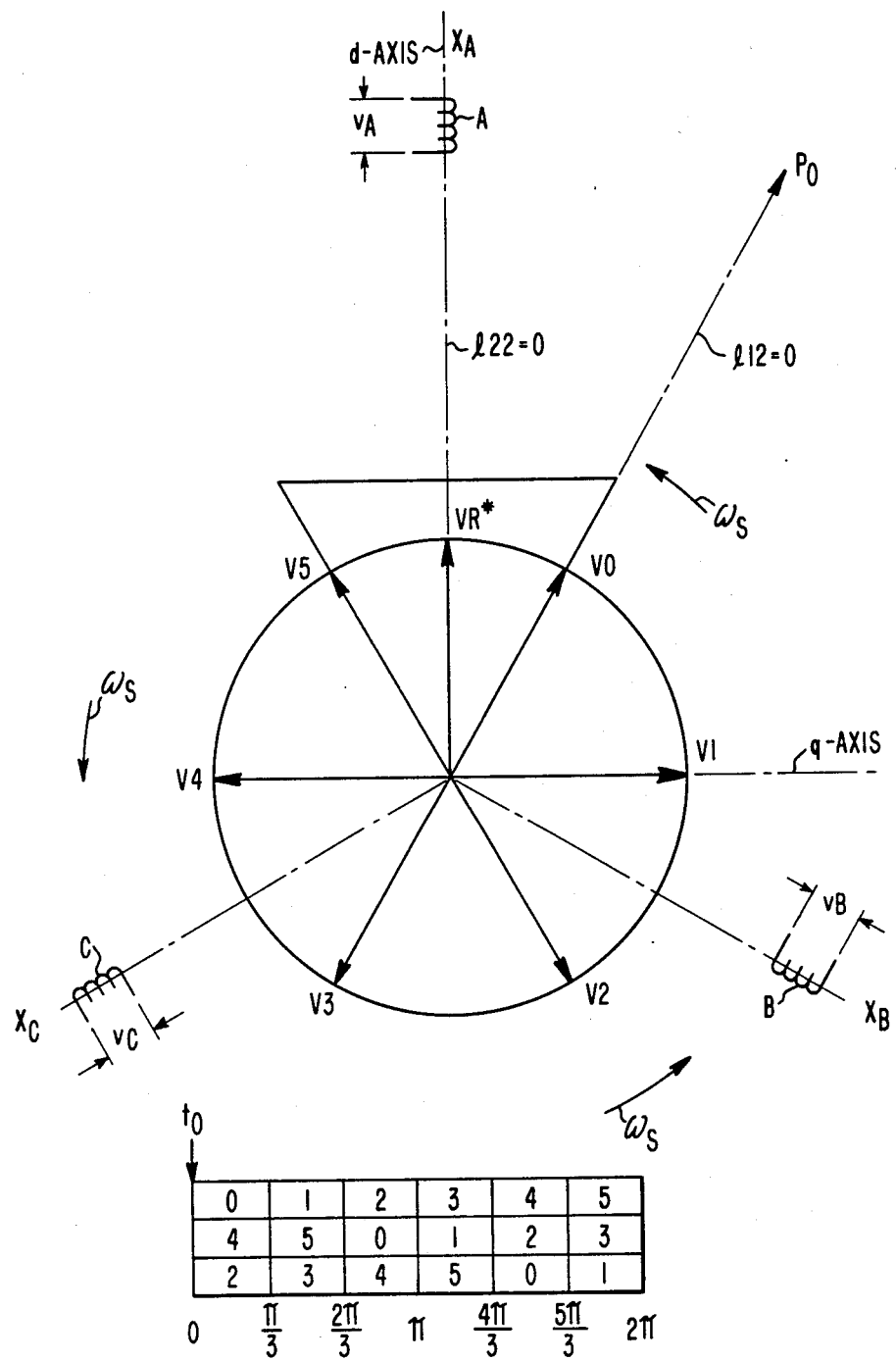
FIG. 11A is a vectorial representation of the vectors involved at the input of the circuit of FIG. 9 when the inputted control signals have zero value.

Referring to FIG. 11A, it is assumed first that the signal on line 12 is at the initial zero value defined by the phase locked loop, and that the signal of line 22 is also zero, thus, for a zero angular position of demand vector $V_R^*$. As shown in FIG. 11A, $V_O$, a vector representing the instantaneous position of vector $V_R$ for zero degree with a combination of switches (042) in logic circuit CTL of FIG. 9, is aligned with an axis at 30° from the zero axis XA of phase A. The angular position at 30° of the $P_o$ axis of FIG. 11A relative to the $X_A$ axis is the result of the definition given for the phase-locked loop PLL of FIG. 9 in response to the input voltage $V_{12}$. On the other hand, vector $V_R^*$, the demand for the output voltage, is aligned with axis XA. The initially chosen combination of switches (042) last 60° of the main cycle, in this case. This window, shown as a triangle in FIG. 11A, defines the extreme vector $V_{R1}$ and $V_{R2}$ such as illustrated in FIG. 7B. When $V_O$ has rotated through 60°, all the vectors $V_1, V_2 \ldots V_5$ at 60° to one another, will have rotated by the same amount. Therefore $V_1$ will occupy the position initially occupied by vector $V_O$. At this moment, in the logic circuit CTL, the operative address is at the junction between combination 042 and combination 153. Immediately, the subsequent combination of switches is chosen (1 for converter CVA, 5 for converter CVB and 3 for converter CVC). Therefore, vector $V_1$ enters the window, also through 60°. The same occurs successively for $V_2, V_3 \ldots$ while vector $V_O$ is moving around the circle as seen from line 12. The end result is for the three output loads, the same as if vector $V_R$ were oscillating in the window between extreme positions at 30 on each side of the demand $V_R^*$. Actual output voltage $V_R$ is, therefore, on the average aligned on the demand $V_R^*$, thus, with axis XA.

Figure 11B:
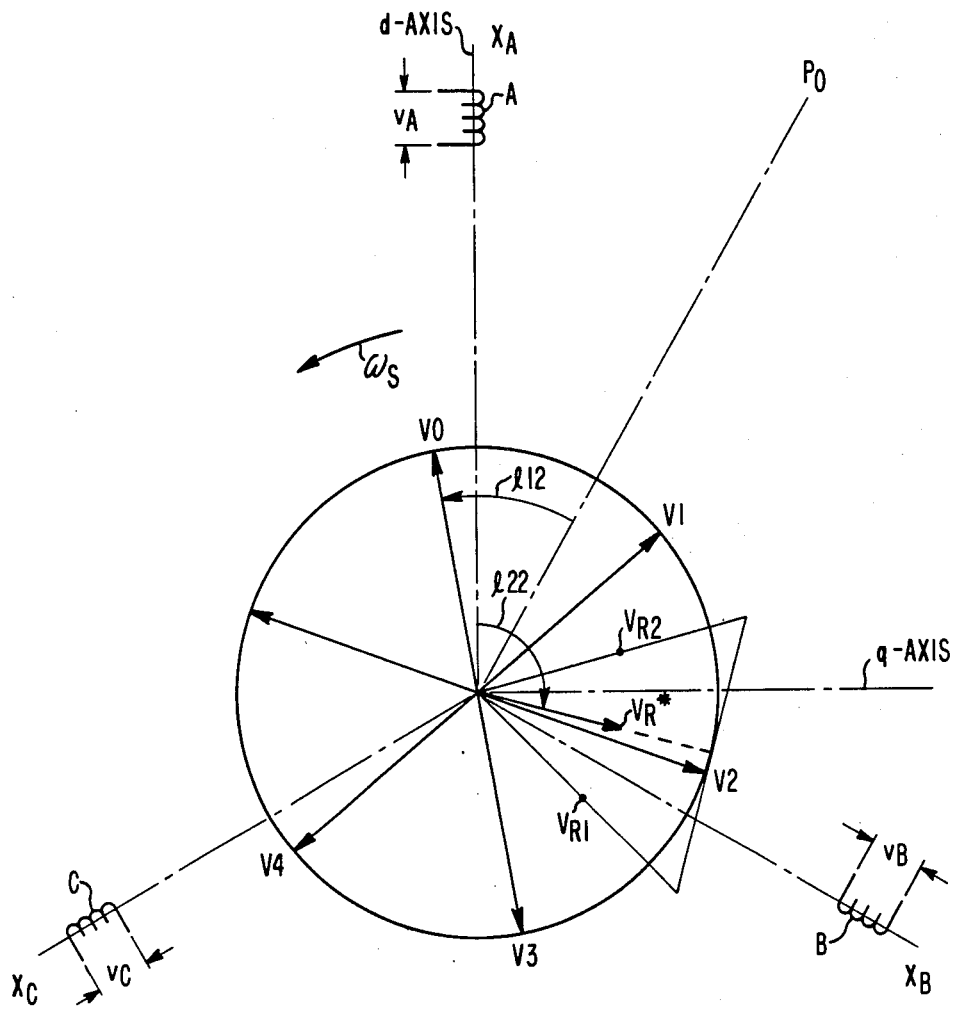
FIG. 11B indicates the vector positions for a definite vector angle demand and at an instant following the initial positioning according to FIG. 11A.

Referring to FIG. 11B, vector $V_O$ is shown instantaneously positioned at an angular position from its zero degree axis $P_O$ as defined by line 12 of FIG. 9. It is assumed that at this moment the demand $V_R^*$ as defined by line 22 is as shown in FIG. 11B counted from the XA axis. Vector $V_R^*$ defines a window (shown as a triangle in the Figure for which $V_R^*$ is the median and the two sides are at 30° on each side) in which $V_2$ is ready to move (with $V_O$) toward an extreme position $V_{R2}$ (FIG. 7B). The combination switches, in this instance, will be (204), and, when $V_2$ reaches $V_{R2}$, a new combination of switches matching (315) for the subsequent zone in the look-up tables of the logic circuit CTL, is automatically selected. It is now $V_3$ which enters the window and goes through 60°. Again, vector $V_R$ appears to oscillate in this window about the position $V_R^*$ required by the signal of line 22.

Figure 11D:
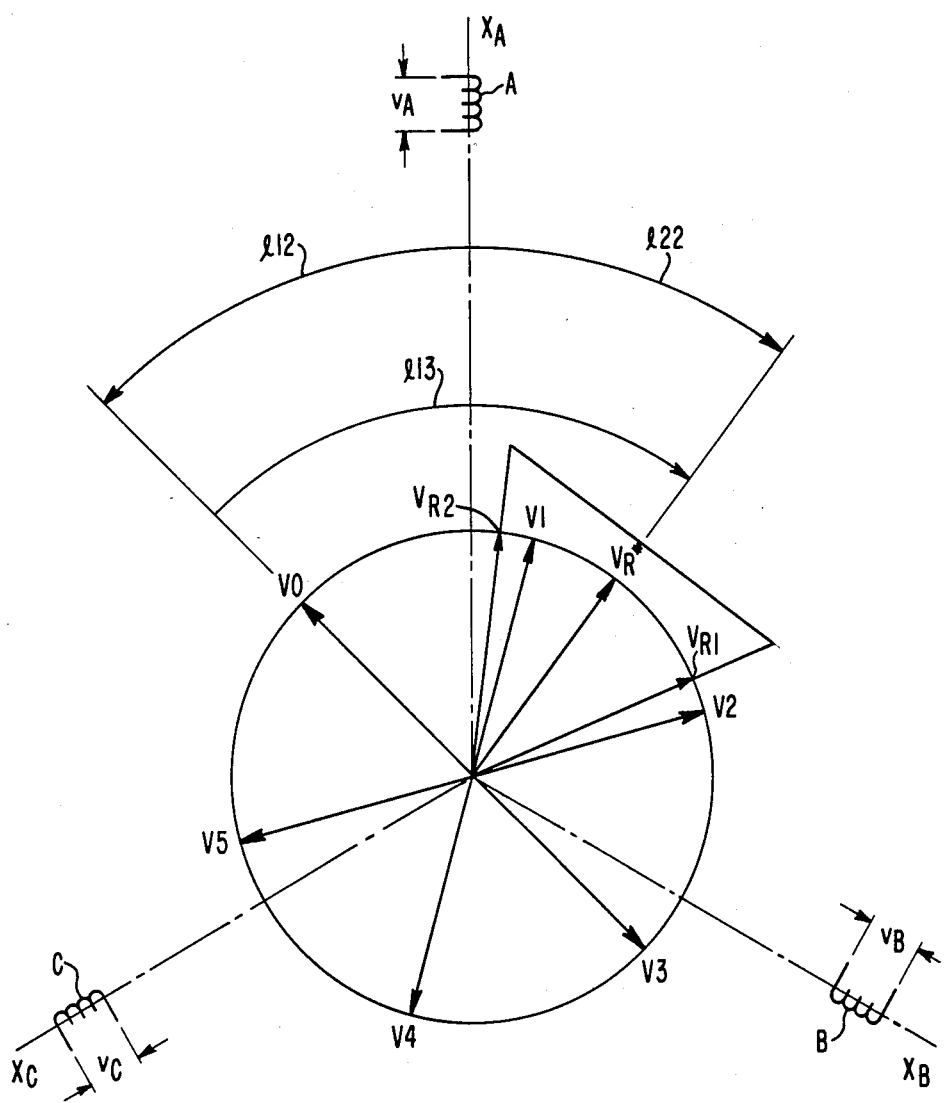
FIG. 11D shows window positioning for a given vector angle demand, the control logic circuit of FIG. 9 being as shown for FIG. 11C.

The signal of line 13 which controls the running selection in the logic circuit CTL represents the signals of lines 12 and 22 combined but with a phase shift therein of 30° as shown by axis $P_O$ relative to the XA axis. In order to make the angle of line 13 clearer, FIGS. 11C and 11D are based on a logic circuit slightly modified by changing the zero degree definition provided by the phase-locked loop of FIG. 9. It is assumed that for zero degree on line 12 vector $V_O$ is aligned with the XA axis. This amounts to choosing the zero in the middle of the 042 definition, 30° from either border thereof. As shown in FIG. 11D, when $V_O$ has moved away from such zero position, line 12 defines from axis XA where vector $V_O$ is, line 22 defines where the vector demand vector $V_R^*$ is asked for, also counted from the XA axis but clockwise, whereas $V_O$ is moving with $V_1, V_2, V_3 \ldots$ counterclockwise. Line 13 is the sum of the two preceding angles, it represents how far at a given instant $V_O$ stands from the required demand vector $V_R^*$. Therefore, line 13 tells at any instant where in the logic circuit CTL is located the demand for vector $V_R^*$.

It has been assumed that line 22 calls for a fixed angular position on the circle. Such a change in vector demand $V_R^*$ may take place at any instant. It may also take place continuously. Thus, vector $V_R^*$ may appear to rotate in position while vector $V_O$ is moving. Such rotation may take place in the same direction as vector $V_O$, thus, forcing a particular selection of switches to last longer than 60° for the main cycle before the new selection of switches causes a jump back by 60°. The result is a rotation in the direction that $V_R$ is moving, but moving slower. This is call the slow stepping mode. If the sign of line 22 is the opposite, the opposite will occur. Vector $V_O$ rotates now by less than 60° during the period of the particular switch swlection. Now the vector demand rotates backward (clockwise in the example) and quickly, further in the same direction, by 60°. This is called the fast stepping mode. It is preferred to use the fast stepping mode because when moving faster, the selections are occurring more frequently so that the harmonic contents are improved. It is observed that if the occurring stepping mode does not agree with such preference, it will suffice to change position in switches SW1 and SW2 to be in the fast stepping mode for the same direction of motion of vector $V_R^*$. In this regard, it is observed that for a direction of rotation as seen from the SW1 switch side, the change of position of switch SW2 will exchange two phases (B and C in the example of FIG. 9), thereby inverting the order of succession of the three phases under the sequence of circuit CTL.

Figure 12A:
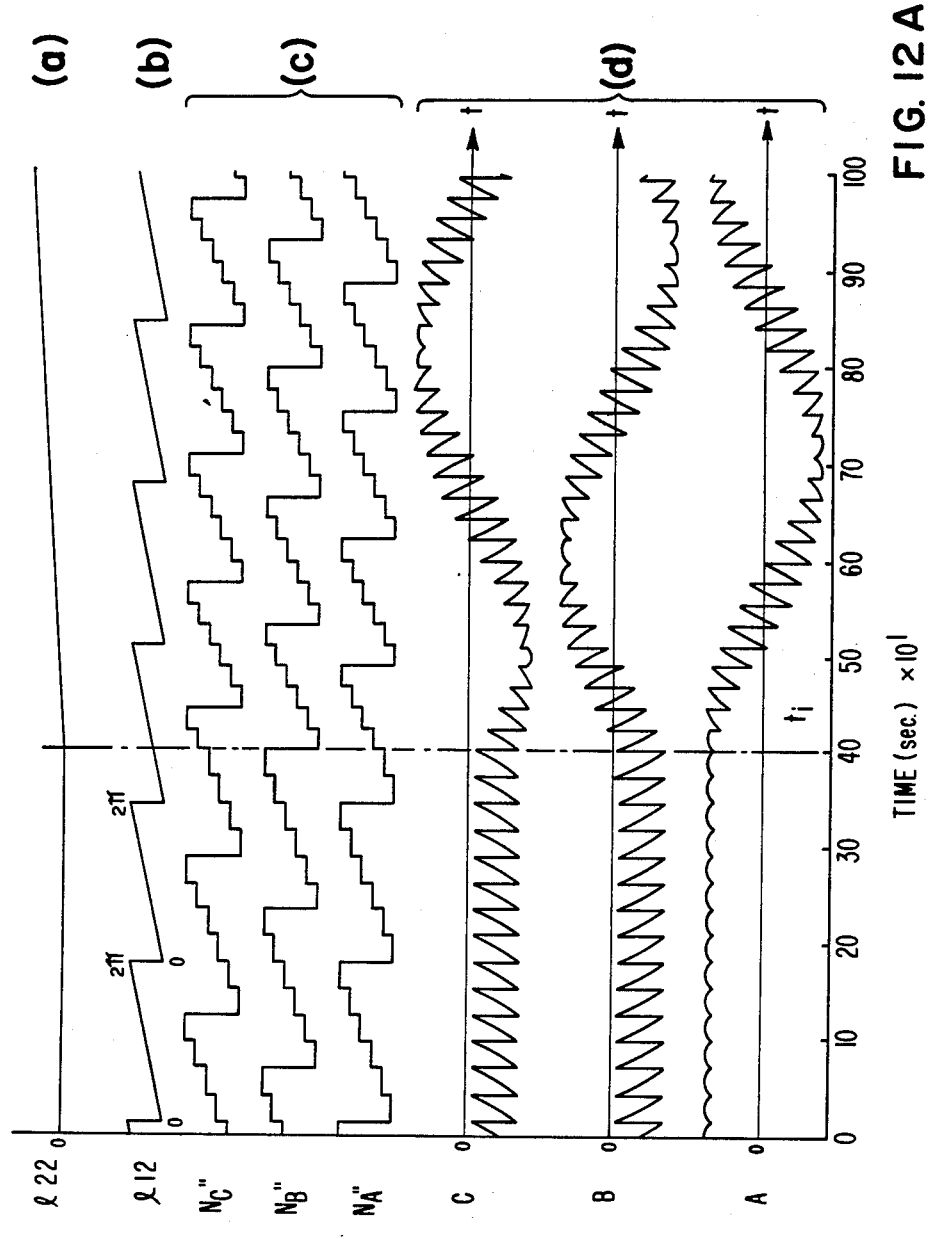
FIG. 12A illustrates with curves the operation of the system of FIG. 1 or FIG. 2 when the output vector angular demand is constant, then increased steadily.
Figure 12B:
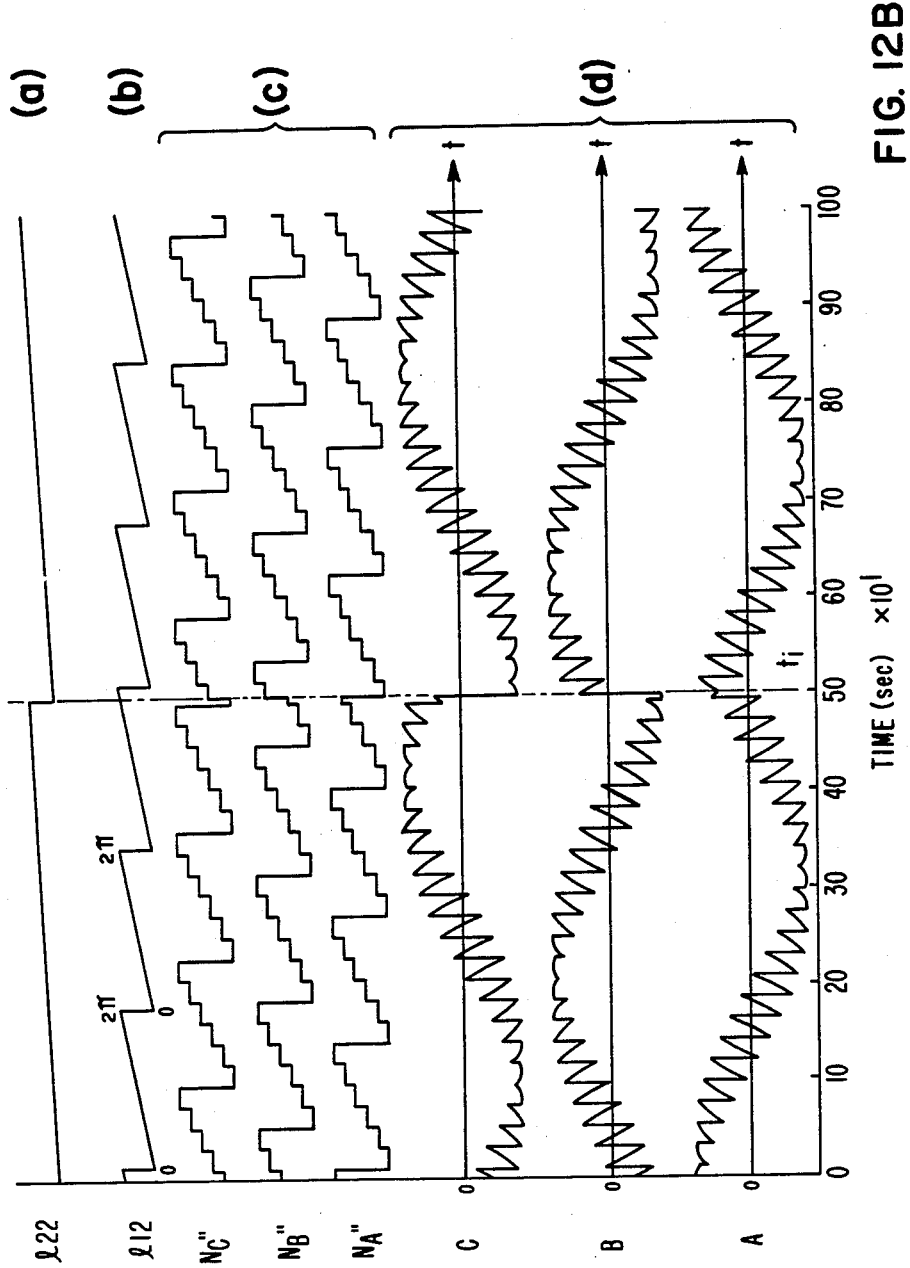
FIG. 12B shows curves like in FIG. 12A when the output vector angular demand is suddenly changed in amplitude.

Referring to FIG. 12A, the operation of the control system according to the invention is illustrated with a command on line 22 (curve (a)) going from zero at time $t_i$ to a slowly ramping value (after instant $t_i$). Curve (b) shows the signal of line 12. Curves (c) show the signal N"A, N"B and N"C as derived from the logic circuit CTL and applied to the signal conditioning circuit SCC which determines how the switches are selected and controlled for conduction for the respective converters (NA on line 18 for CVa, NB on line 19 for CVB and NC on line 20 for converter CVC). Since line 12 is zero until instant $t_i$, signal N"A covers the same $2\pi$ range as line 12, synchronously. The other two signals are at 120° angle, one forward, the other backward. In the same time range on the axis XA, phase A is supplied with the peak value $V_A$ of the voltage $V_{12}, V_{23}, \ldots$ as they successively occur from one switching combination to the next, while the two other phases appear in projection on the d-axis (FIG. 6) with a reduced magnitude as suggested by FIGS. 6 and 7A. At instant $t_o$, the signal of line 22 starts increasing. This causes an output frequency for the output voltage of the UFC as shown by curves (d) where the oscillations of the rotating vector $V_R^*$ are marked on the sine waves occurring upon each change of the combination of switches by circuit CTL. FIG. 12B differs from FIG. 12A in that at instant $t_i$, the steadily increasing signal of line 22 experiences an abrupt change. As a result, as shown by the curves under (d), a brisk phase shift occurs at time $t_i$. Otherwise, the three sine waves after instant $t_i$ behave like before the phase shift.

Figure 12C:
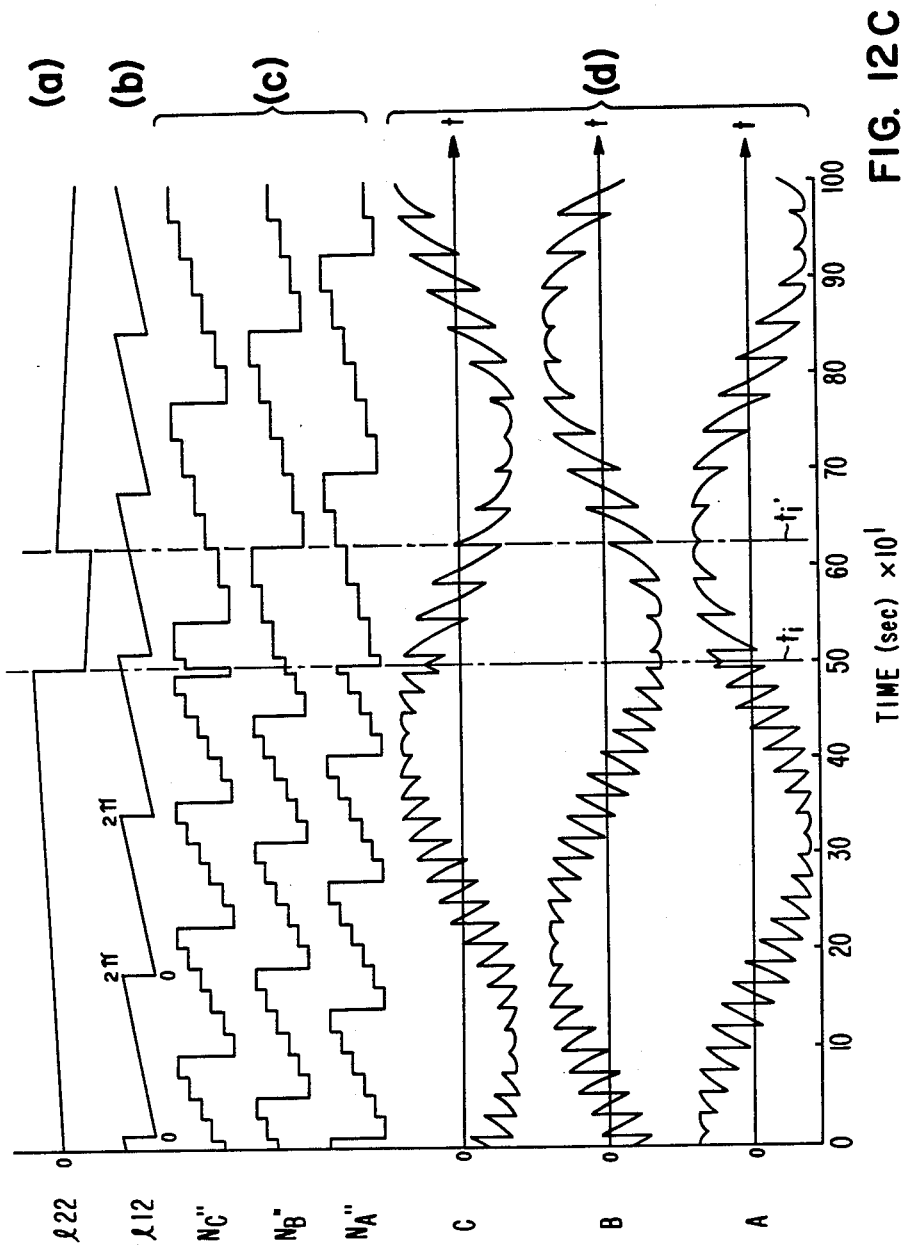

FIG. 12C shows up to instant $t_i$ the generation of three sine waves under (d) for the three phases A, B, C at the output as in FIG. 12A after instant $t_i$, and as in FIG. 12B, namely with a signal on line 22 which from zero increases linearly. After instant $t_i$, the signal of line 22 is changed abruptly by changing the position of both switches SW1 and SW2, thereby to change the sign of the signal of line 22 and the sequence of the output phase as seen from logic circuit CTL. As a result, the signal of line 22 takes a negative scope. The result is a change from the fast stepping mode, assumed initially, to the slow stepping mode, as shown in FIG. 12C. The distinction between these two modes of operation is visible in FIG. 12C where the oscillations in each window between two changes of switch combination appear more spaced to the right of instant $t_i$ (slow stepping mode) than to the left of instant $t_i$ (fast stepping mode).

The logic circuit CTL defines a pattern of switching combinations as earlier stated for T1/3 periods through the $2\pi$ radians range for each converter CVA, CVB, CVC, each in response to the addressing signal of line 13 which represents the operative angle illustrated on FIGS. 11A–11D. The switching patterns are stored in a ROM device addressed from line 13. It is understood that, while for the sake of clarity the signals of lines 12, 22 and 13 are shown in analog form, all signals are preferably used in digital form, so as to interface directly with the ROM circuitry of logic CTL; similarly, the outputted signals N'A, N'B, N'C or rather N"A, N"B, N"C when seen beyond switch SW2, are also in digital form.

Digital treatment with look-up tables is well known in the art. For instance, reference may be had to U.S. Pat. Nos. 4,488,216 (FIG. 12) and 4,581,696 (FIGS. 32 and 34) which illustrate digital implementation of a switching pattern, though, in another context.

Figure 13A:
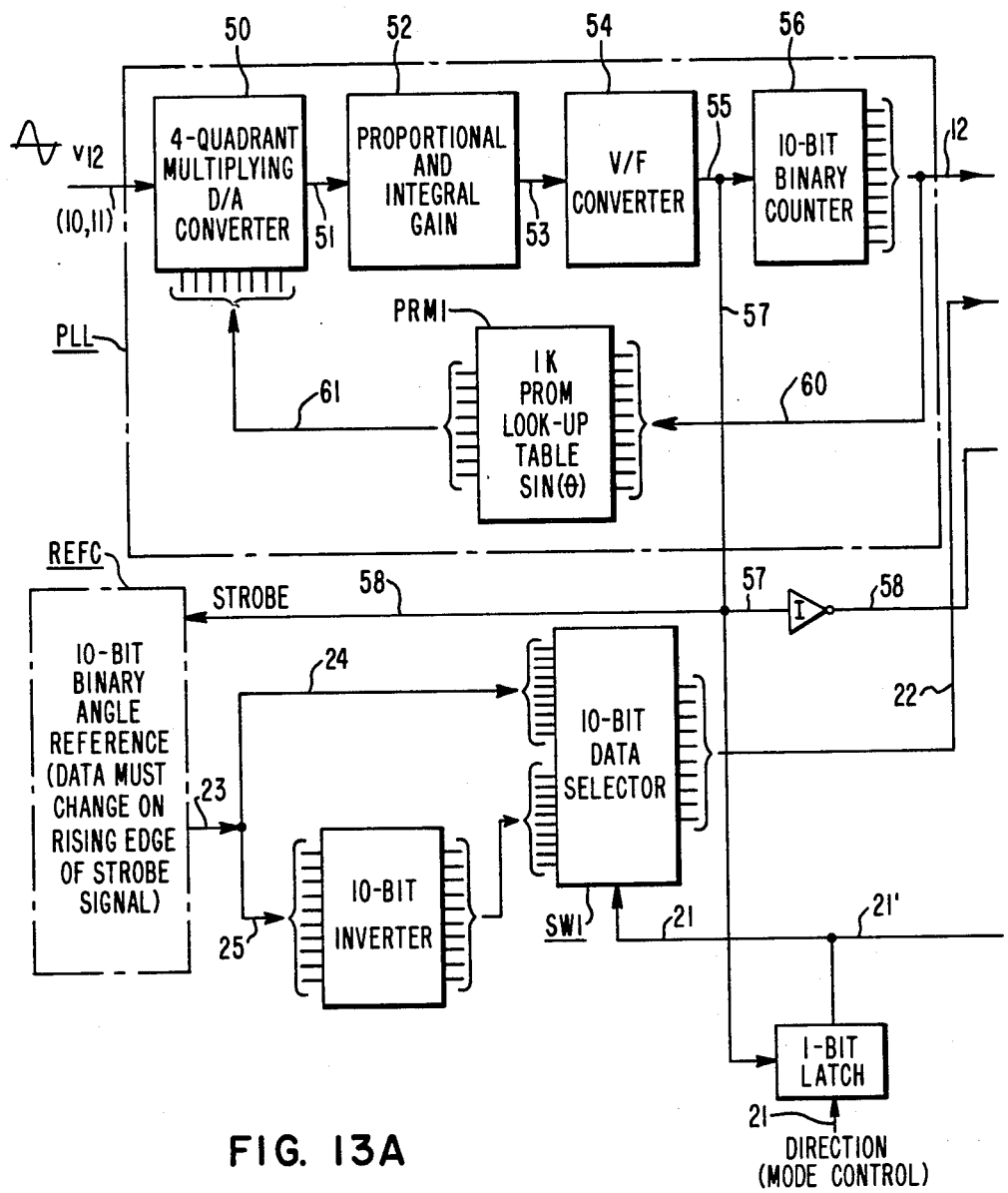
FIGS. 13A and 13B are block diagrams illustrating the implementation of the circuit of FIG. 9.
Figure 13B:
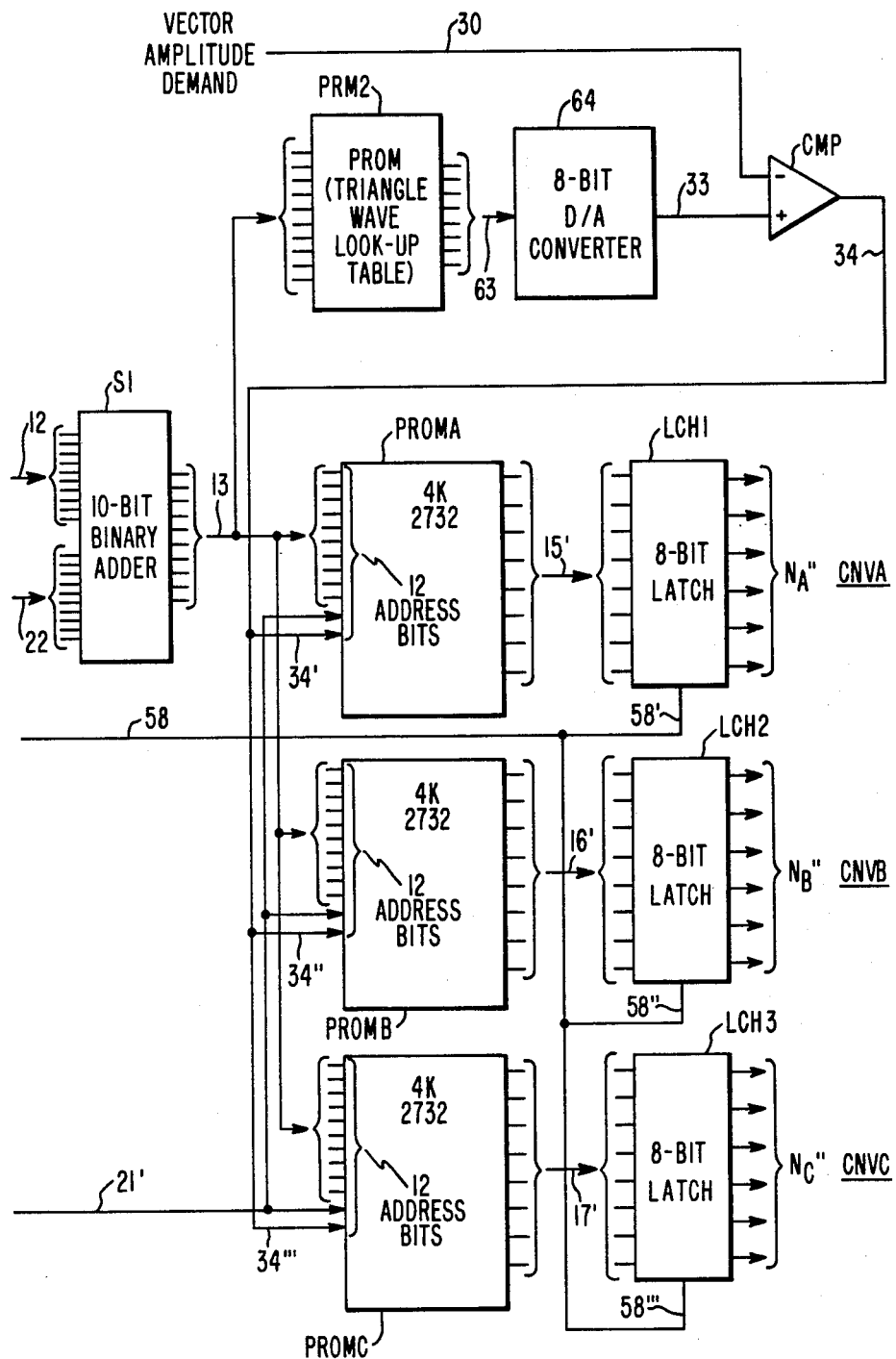

Referring to FIG. 13, the circuit of FIG. 9 is shown implemented with solid state devices.

A reference circuit REFC provides a 10-bit binary angle reference derived on the rising edge of a strobe signal applied on line 58, and data is applied by lines 23, 24 to one-half of a 10-bit data selector used in place of the switch SW1 of FIG. 9. By line 25 from line 23, the data go to a 10-bit inverter providing the negative equivalent on line 25 which goes to lines 24 and 25 the other half of switch SW1 provide the parallel information in switch SW1 which selects either of the two 10-bit data depending upon a control signal applied on line 21. This signal comes from a mode control selection signal, on line 21, passed through a 1-bit latch which is controlled to latch as the latch signal from lines 57 or 58, shall tell. The output from switch SW1 carries the selected information (from line 24 or from line 25') onto line 22 and to a 10-bit binary adder 51. The phase locked loop PLL is shown to include a four-quadrant multiplying D/A converter 50 responsive to the line-to-line voltage $V_{12}$ and to the digital representation of the phase angle $\Theta$ derived at the output (line 12). The hybrid circuit 50 is a chip 7524 allowing the full quadrant multiplication of an analog input by a digital input (line 61). The two sine waves so multiplied result in a DC component (the harmonic component being filtered out) when they have the same frequency. They are synchronized when they are at 90° out of phase, and the DC output (line 51) is zero. The output on line 51 is passed into a proportional + integral gain circuit 52. The voltage output is by line 53 applied to a voltage to frequency converter 54 (a VCO), and the pulse-train outputted on line 55 is integrated by a 10-bit binary counter 56 provided on line 12 the phase angle. The phase angle is fed back through a 1K PROM (PRM1) which contains a look-up table of sin $\Theta$, addressed by line 60 to provide on line 61 the sin $\Theta$ digital input for circuit 50. The 10-bit information from line 12 goes with the 10-bit information from line 22 to the 10-bit binary adder 51. The result is outputted on line 13 which goes to three PROMS: PROMA, PROMB, PROMC which pertain to the respective converters CNVA, CNVB and CNVC. Each PROM is a 4K, 2732 device leaving 12 address bits, the two last ones being used one for the change of sequence (SW2) by lines 21', the other for short-circuiting of the main switches, by lines 34', 34", and 34''', respectively.

Control of the magnitude of the vector is from line 30 to a comparator CMP which receives on line 33 a triangular wave derived from lines 13 and 14, through a PROM (PRM2) containing in look-up table form the triangle waves addressed by the running signal of lines 13 and 14. At the output of PRM2, the digital signal of line 63 is converted to analog by a 8-bit D/A converter 64, outputting on line 33 the wave to be intersected with by the magnitude of the reference signal of line 30.

The outputs on lines 15', 16', and 17' are latched into respective latches LCM1, LCM2, LCM3 (which are 8-bit latch solid state devices) to generate the forming signals of lines NA", NB" and NC" which go to the sine power switches of CNVA, CNVB and CNVC, respectively.

Strobing is timed by the pulse train of lines 55, 57 to determine a change of dta upon its rising edge from line 57 to line 58 (for reference REFC) and to line 58' for the 1-bit latch of line 21, to lines 59, 59' (after inversion) for the three latches LCM1, LCM2, LCM3.

I claim:
1. In a UFC system including a plurality of static bilateral switches controlled for conduction to successively interconnect selected pairs of the input terminals of a three-phase AC voltage source with corresponding pairs of output terminals belonging to a three-phase load;

said selected pairs being selected in accordance with a predetermined sequential order in each load phase and for a predetermined succession of said load phases; the combination of:

means responsive to said AC voltage source for deriving a signal representative of actual electrical degree run by said AC voltage source in a cyclic succession from a zero angle reference;

means for providing a signal representative of an output voltage vector demand angle for said AC load;

comparator means responsive to said actual electrical degree representative signal and to said vector demand angle representative signal for providing an address signal representative of the phase shift between said vector demand angle and said electrical degree;

ROM means for storing electrical angle values related to said zero angle reference as addressed values, and for storing in relation thereto predetermined switch combinations commands;

said ROM means being responsive to said comparator means for selecting a combination command in accordance with said address signal; and means responsive to said ROM means for establishing with said switches a switch combination for conduction in accordance with said address signal and the corresponding switch combination command.

2. The system of claim 1, with said ROM means defining a plurality of successive ranges for said vector angle demand; said addressed values being distributed in sequential order among said successive ranges and in accordance with the successive values of said address signal.

3. The system of claim 2 with said plurality of switches including eighteen said bilateral switches; said ROM means successive ranges representing a succession of six $\pi/3$ radians angle domains; and said switching combination commands representing for each phase of said three-phase load six different pairs of said bilateral switches; said six pairs of bilateral switches in a phase being at 120 degree phase shift from the six pairs thereof in an adjacent phase.

4. The system of claim 3 with each switch combination command changing upon passing within said ROM means from one $\pi/3$ radian angle domain to the next.

5. The system of claim 4 with first switching means being provided for changing the sign of said vector demand angle representative signal and second switching means being provided for causing a correlative sequential order change between said switch combination commands relative to the natural succession of said load phases.

6. The system of claim 4 with means responsive to a vector amplitude demand for establishing a shorter duration in the conduction of said switch combination established by said ROM means responsive means.

7. The system of claim 6 with means for short-circuiting said output terminals; said short-circuit means being controlled for duration in relation to said vector amplitude demand through said vector amplitude demand responsive means.

8. The system of claim 7 with vector amplitude demand responsive means being also responsive to said address signal for establishing $\pi/3$ radian angle domains matching the successive ranges established by said ROM means.

9. The system of claim 8 wherein said vector amplitude demand is determining a sub-interval within said established domains for short-circuiting said output terminals.

* * * * *